(12) United States Patent
Kline et al.

(10) Patent No.: US 11,869,360 B2
(45) Date of Patent: *Jan. 9, 2024

(54) EMPATHIC AUTONOMOUS VEHICLE

(71) Applicant: INTERNATIONAL BUSINESS MACHINES CORPORATION, Armonk, NY (US)

(72) Inventors: Eric V. Kline, Pine Island, MN (US); Sarbajit K. Rakshit, Kolkata (IN)

(73) Assignee: International Business Machines Corporation, Armonk, NY (US)

(*) Notice: Subject to any disclaimer, the term of this patent is extended or adjusted under 35 U.S.C. 154(b) by 478 days.

This patent is subject to a terminal disclaimer.

(21) Appl. No.: 17/128,515

(22) Filed: Dec. 21, 2020

(65) Prior Publication Data

US 2021/0110718 A1 Apr. 15, 2021

Related U.S. Application Data

(62) Division of application No. 15/802,628, filed on Nov. 3, 2017, now Pat. No. 11,151,883.

(51) Int. Cl.
| | |
|---|---|
| *G08G 1/00* | (2006.01) |
| *G08G 1/16* | (2006.01) |
| *G08G 1/0965* | (2006.01) |
| *G05D 1/00* | (2006.01) |
| *G08G 1/0967* | (2006.01) |

(52) U.S. Cl.
CPC ........... *G08G 1/205* (2013.01); *G05D 1/0088* (2013.01); *G08G 1/0965* (2013.01); *G08G 1/096791* (2013.01); *G08G 1/161* (2013.01); *B60W 2556/65* (2020.02); *G05D 2201/0213* (2013.01)

(58) Field of Classification Search
CPC ............... G08G 1/205; G08G 1/0965; G08G 1/096791; G08G 1/161; G05D 1/0088; G05D 2201/0213; B60W 2556/65
See application file for complete search history.

(56) References Cited

U.S. PATENT DOCUMENTS

| | | |
|---|---|---|
| 8,983,682 B1 | 3/2015 | Peeters et al. |
| 10,423,934 B1 | 9/2019 | Zanghi et al. |
| 2002/0026266 A1 | 2/2002 | Montague |

(Continued)

OTHER PUBLICATIONS

Akinbolusere, Michael A. "Empathy Map for Autonomous Cars", retrieved at: Ideahttps://prezi.com/hk-xhjvj8hhu/empathy-map-for-autonomous-cars/; dated Nov. 2, 2014; 2 pgs.

(Continued)

*Primary Examiner* — Michael J Zanelli
(74) *Attorney, Agent, or Firm* — Cantor Colburn LLP; Tihon Poltavets (57) ABSTRACT

An autonomous vehicle is provided. The autonomous vehicle includes a vehicle body, sensors and a processing element. The sensors are deployed on the vehicle body to sense surroundings of the vehicle body. The processing element is coupled to the vehicle body and the sensors. The processing element is configured to receive information from the sensors and to control driving operations of the vehicle body in accordance with the received information. The processing element is also configured to interpret at least a portion of the received information as being indicative of a troublesome incident and to deduce that a need for help to address the troublesome incident exists.

10 Claims, 6 Drawing Sheets

(56) References Cited

U.S. PATENT DOCUMENTS

| | | |
|---|---|---|
| 2006/0089766 A1 | 4/2006 | Allard et al. |
| 2011/0130636 A1 | 6/2011 | Daniel et al. |
| 2012/0164968 A1 | 6/2012 | Velusamy et al. |
| 2013/0132088 A1 | 5/2013 | Kim |
| 2013/0144670 A1 | 6/2013 | Kickbusch |
| 2014/0277910 A1 | 9/2014 | Suh et al. |
| 2014/0309933 A1 | 10/2014 | Shin et al. |
| 2015/0066284 A1 | 3/2015 | Yopp |
| 2015/0148988 A1 | 5/2015 | Fleck |
| 2015/0348335 A1 | 12/2015 | Ramanujam |
| 2016/0125735 A1 | 5/2016 | Tapio et al. |
| 2017/0008521 A1 | 1/2017 | Braunstein et al. |
| 2017/0046216 A1 | 2/2017 | Stenneth |
| 2017/0084175 A1 | 3/2017 | Sedlik et al. |
| 2017/0124407 A1 | 5/2017 | Micks et al. |
| 2017/0140603 A1 | 5/2017 | Ricci |
| 2017/0168502 A1 | 6/2017 | Gordon et al. |
| 2017/0217429 A1 | 8/2017 | Shioe |
| 2017/0220956 A1 | 8/2017 | Stephens et al. |
| 2017/0225567 A1 | 8/2017 | Tsuda |
| 2017/0228520 A1 | 8/2017 | Kidd et al. |
| 2017/0248950 A1 | 8/2017 | Moran et al. |
| 2017/0262755 A1 | 9/2017 | Takeuchi et al. |
| 2017/0278312 A1 | 9/2017 | Minster et al. |
| 2017/0370736 A1 | 12/2017 | Singh |
| 2018/0023966 A1 | 1/2018 | Iwai et al. |
| 2018/0025636 A1 | 1/2018 | Boykin et al. |
| 2018/0050800 A1 | 2/2018 | Boykin et al. |
| 2018/0120837 A1 | 5/2018 | Regmi et al. |
| 2018/0124213 A1 | 5/2018 | Wood |
| 2018/0164108 A1 | 6/2018 | Rahal-Arabi et al. |
| 2018/0225769 A1 | 8/2018 | Slusar |
| 2018/0229725 A1 | 8/2018 | Akama et al. |
| 2019/0049960 A1 | 2/2019 | Battles et al. |
| 2019/0114934 A1 | 4/2019 | Asa et al. |
| 2019/0137287 A1 | 5/2019 | Pazhayampallil et al. |
| 2019/0138007 A1 | 5/2019 | Baghsorkhi et al. |
| 2019/0139417 A1 | 5/2019 | Kline et al. |
| 2019/0179345 A1 | 6/2019 | McEwan et al. |
| 2019/0196481 A1 | 6/2019 | Tay et al. |
| 2019/0197497 A1 | 6/2019 | Abari et al. |
| 2019/0235487 A1 | 8/2019 | Zhao et al. |
| 2019/0282155 A1 | 9/2019 | Amant et al. |
| 2019/0287392 A1 | 9/2019 | Bielby |
| 2019/0322291 A1 | 10/2019 | Tsuda |
| 2019/0366557 A1 | 12/2019 | Gewickey et al. |
| 2020/0000392 A1 | 1/2020 | Nashida et al. |
| 2020/0019165 A1 | 1/2020 | Levandowski et al. |
| 2020/0064146 A1 | 2/2020 | Kitajima et al. |
| 2020/0064831 A1 | 2/2020 | Pedersen et al. |
| 2020/0117190 A1 | 4/2020 | Schmitt et al. |
| 2020/0166924 A1 | 5/2020 | Pedersen et al. |
| 2020/0175739 A1 | 6/2020 | Meister et al. |
| 2020/0198783 A1 | 6/2020 | Kundu et al. |
| 2020/0223444 A1 | 7/2020 | Bonanni |
| 2020/0285246 A1 | 9/2020 | Rakshit et al. |

OTHER PUBLICATIONS

IBM "List of IBM Patents or Patent Applications Treated as Related"; (Appendix P), Filed Jan. 2, 2021; 2 pages.

Lin, Patrick "The Ethics of Autonomous Cars", The Atlantic; retrieved at: https://www.theatlantic.com/technology/archive/2013/10/the-ethics-ofautonomous-cars/280360/; dated Oct. 8, 2013; 11 pgs.

Maynard, Andrew "The New Industrial Revolution Could Use a Lesson in Empathy", ZocaloPublicSquare.org; retrieved at: http://www.zocalopublicsquare.org/2016/01/29/the-new-industrialrevolution-could-use-a-lesson-in-empathy/ideas/nexus/; dated Jan. 29, 2016; 9 pgs.

Miller, Meg "A Designer's Guide to Tech in 2017", FastCompany; retrieved at: https://www.fastcodesign.com/3067015/a-designers-guide-to-tech-in-2017; dated Jan. 13, 2017; 10 pgs.

Naughton, Keith "Should a Driverless Car Decide Who Lives or Dies?", Bloomberg; retrieved at: https://www.bloomberg.com/news/articles/2015-06-25/should-adriverless-car-decide-who-lives-or-dies-in-an-accident-; dated Jun. 25, 2015, 4 pgs.

EMPATHIC AUTONOMOUS VEHICLE

DOMESTIC PRIORITY

This application is a divisional application of the legally related U.S. Ser. No. 15/802,628 filed Nov. 3, 2017 and published as U.S. Patent Publication No. 2019-0139417 May 9, 2019, the contents of which are incorporated by reference herein in their entirety.

BACKGROUND

The disclosure relates generally to an autonomous vehicle that is capable of empathic decision making.

An autonomous vehicle (also known as a driverless car, a self-driving car, a robotic car, etc.) is a vehicle that is capable of sensing its environment and navigating without human input. Autonomous cars typically use a variety of techniques to detect their surroundings. These include, but are not limited to, radar-based sensors, laser-based sensors, global positioning system (GPS) technology, odometry and computer vision. Autonomous cars may also include advanced control systems which interpret sensory information to identify appropriate navigation paths, other cars, obstacles and relevant signage.

SUMMARY

According to one or more embodiments, an autonomous vehicle is provided. The autonomous vehicle includes a vehicle body, sensors, and a processing element. The sensors are deployed on the vehicle body to sense surroundings of the vehicle body. The processing element is coupled to the vehicle body and the sensors. The processing element is configured to receive information from the sensors and to control driving operations of the vehicle body in accordance with the received information. The processing element is also configured to interpret at least a portion of the received information as being indicative of a troublesome incident and to deduce that a need for help to address the troublesome incident exists.

According to one or more embodiments, a system for operating multiple autonomous vehicles is provided. Each of the autonomous vehicles includes a vehicle body, sensors, and a processing element. The sensors are deployed on the vehicle body to sense surroundings of the vehicle body. The processing element is coupled to the vehicle body and the sensors and is configured to receive information from the sensors and to control driving operations of the vehicle body in accordance with the received information. The processing element of each of the multiple autonomous vehicles is communicative with processing elements of other ones of the multiple autonomous vehicles to form a network. The network is configured to cooperatively interpret at least a portion of the received information from the sensors as being indicative of a troublesome incident and to cooperatively deduce that a need for help to address the troublesome incident exists.

According to one or more embodiments, a method of operating multiple autonomous vehicles is provided. The method includes controlling driving operations of the vehicle body of each of the multiple autonomous vehicles in accordance with received sensor information. The method further includes establishing communications between processing elements of the multiple autonomous vehicles to form a network. The method also includes maintaining the network to cooperatively interpret at least a portion of the received sensor information as being indicative of a troublesome incident and to cooperatively deduce that a need for help to address the troublesome incident exists.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Self-driving or autonomous vehicles can drive themselves without human input based on various parameters such as traffic situations, road conditions, weather conditions, etc. A manually driven vehicle, on the other hand, would be a conventional vehicle that is driven by an operator or a driver. Oftentimes, a defining characteristic of the driver is that he exhibits empathy towards other drivers on the road. In such cases, if that driver drives by an accident where immediate attention or help is needed, he might stop to offer help (e.g., he might offer to take victims to the hospital or tow their cars). A conventional autonomous vehicle is not capable of such empathy and thus would not offer help. Rather, conventional autonomous vehicles will simply drive up to and past accident scenes without stopping unless it receives specific commands to stop.

In view of the above, embodiments disclosed herein may include an autonomous vehicle that is capable of interpreting at least a portion of received sensor information as being indicative of a troublesome incident and to deduce that a need for help to address the troublesome incident exists. Embodiments may also include a system of operating multiple autonomous vehicles and a method of operating multiple autonomous vehicles. In a general sense, the autonomous vehicle(s) disclosed herein will automatically understand that a need for help exists and will automatically offer such help based on a comparative priority analysis. This comparative priority analysis may include, for example, determining that if the owner of the autonomous vehicle is empathetic himself, then the autonomous vehicle(s) will be empathetic as well.

Figure 1:
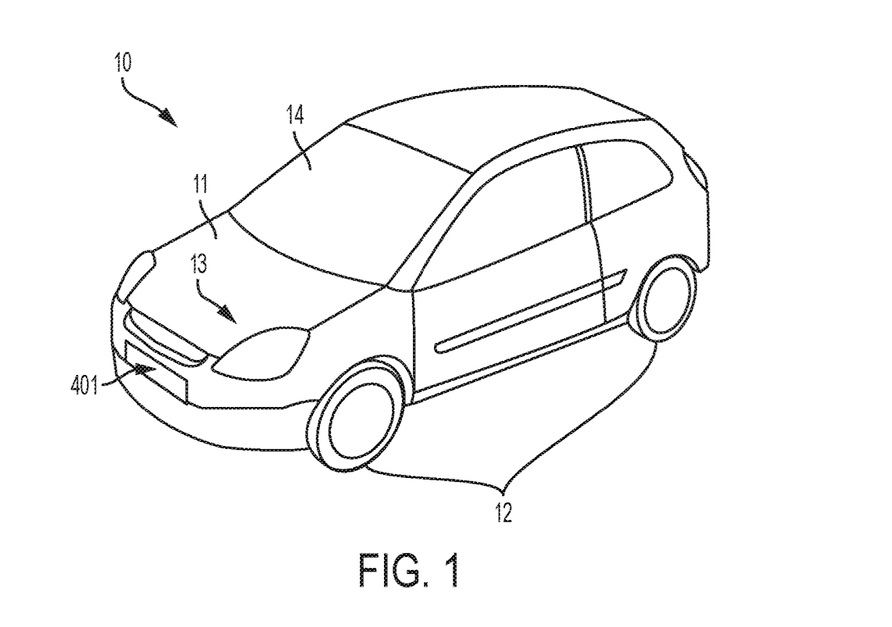
FIG. 1 is a side view of an autonomous vehicle in accordance with embodiments of the invention.

Turning now to FIG. 1, an autonomous vehicle 10 is provided. The autonomous vehicle 10 may be provided as a car as shown in FIG. 1 or as any other ground-based or flight-capable vehicle. For purposes of clarity and brevity, however, the following description will relate only to the case of the autonomous vehicle 10 being provided as a car.

The autonomous vehicle 10 includes a vehicle body. The vehicle body includes a vehicle frame 11, a set of steerable wheels 12 on which the vehicle frame 11 sits, an engine 13 which is configured to drive the wheels 12 and a cabin 14 defined by the vehicle frame 11. The cabin 14 may be configured to accommodate one or more passengers therein and includes several control elements which can be accessed by a driver or operator if necessary.

Figure 2:
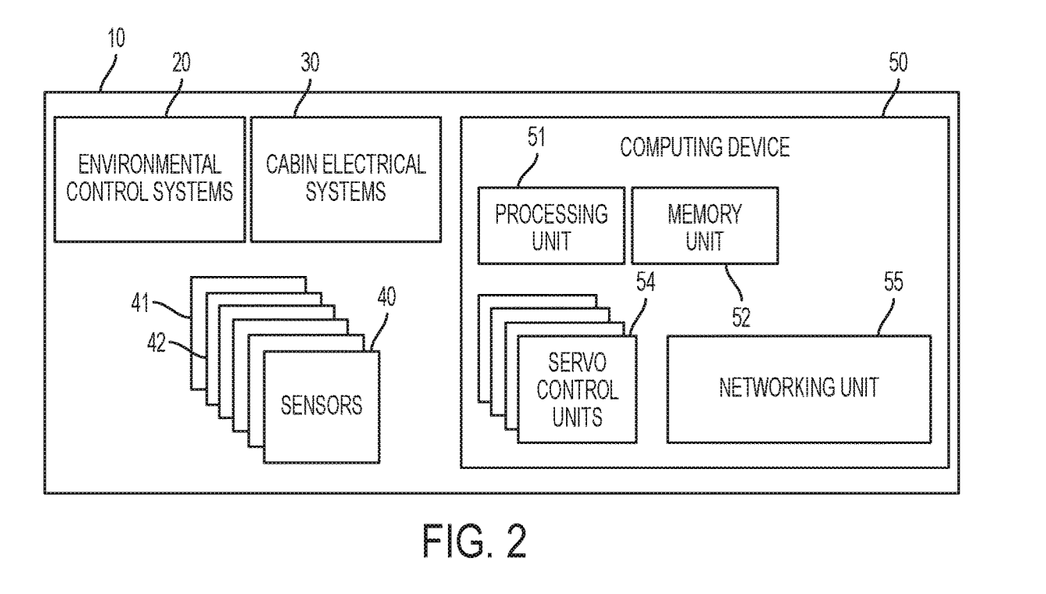
FIG. 2 is a schematic diagram of a computing device of the autonomous vehicle of FIG. 1 in accordance with embodiments of the invention.

With continued reference to FIG. 1 and with additional reference to FIG. 2, the autonomous vehicle 10 may further include various environmental control systems 20, cabin electrical systems 30, a plurality of sensors 40 distributed around the vehicle frame 11 and a processing element 50 among many other features. The various environmental control systems 20 may include, for example, heating, ventilation, and air conditioning (HVAC) systems as well as vehicle window opening and closing systems. The cabin electrical systems 30 may include vehicle status indicators and audio and visual (AV) systems. The plurality of sensors 40 includes optical sensors 41 and audio sensors 42, speed and attitude sensors, global positioning system (GPS) elements, cabin environmental sensors, etc. The processing element 50 may be housed in various positions about the vehicle frame 11 and includes a central processing unit (CPU) 51, a memory unit 52, one or more servo control units 54 and a networking unit 55.

The memory unit 52 includes various types of random access and read only memory, among other types of memory, and has executable or program instructions (hereinafter referred to as "program instructions") stored thereon. The program instructions, when executed by the CPU 51 causes the CPU 51 to control various operations of the autonomous vehicle 10 as described herein on its own and/or by way of the one or more servo control units 54. As examples, the program instructions cause the CPU 51 to control operations of the wheels 12 and the engine 13, the environmental control system 20 and the cabin electrical system 30 based at least in part on the readings of the plurality of sensors 40.

That is, during driving operations, the plurality of sensors 40 take readings of various aspects of the surroundings of the autonomous vehicle 10. These readings may include, for example, road conditions, environmental conditions, streetlight status and signage and obstacle presence. Information that is indicative of the readings is transmitted from the plurality of the sensors 40 to the CPU 51. The CPU 51 thus receives the information from the plurality of the sensors 40 whereupon the program instructions cause the CPU 51 to issue commands to the one or more servo control units 54 to control driving operations of the vehicle body in accordance with the received information. Thus, in some embodiments of the invention, the CPU 51 effectively controls driving operations of the steerable wheels 12 and the engine 13 in accordance with the received information.

In accordance with additional embodiments of the invention, while conventional autonomous vehicles lack the capability to recognize and understand events that are generally inconsistent with normal driving conditions, the program instructions cause the CPU 51 to interpret at least a portion of the received information from the plurality of the sensors 40 as being indicative of a troublesome incident and to deduce that a need for help to address the troublesome incident exists. The troublesome incident may be, for example, an accident or a disabled vehicle in which one or more individuals require assistance or, in some cases, medical assistance. The need for help in these or other cases may be a need for a working telephone, tow service or a ride to a local hospital.

Figure 3:
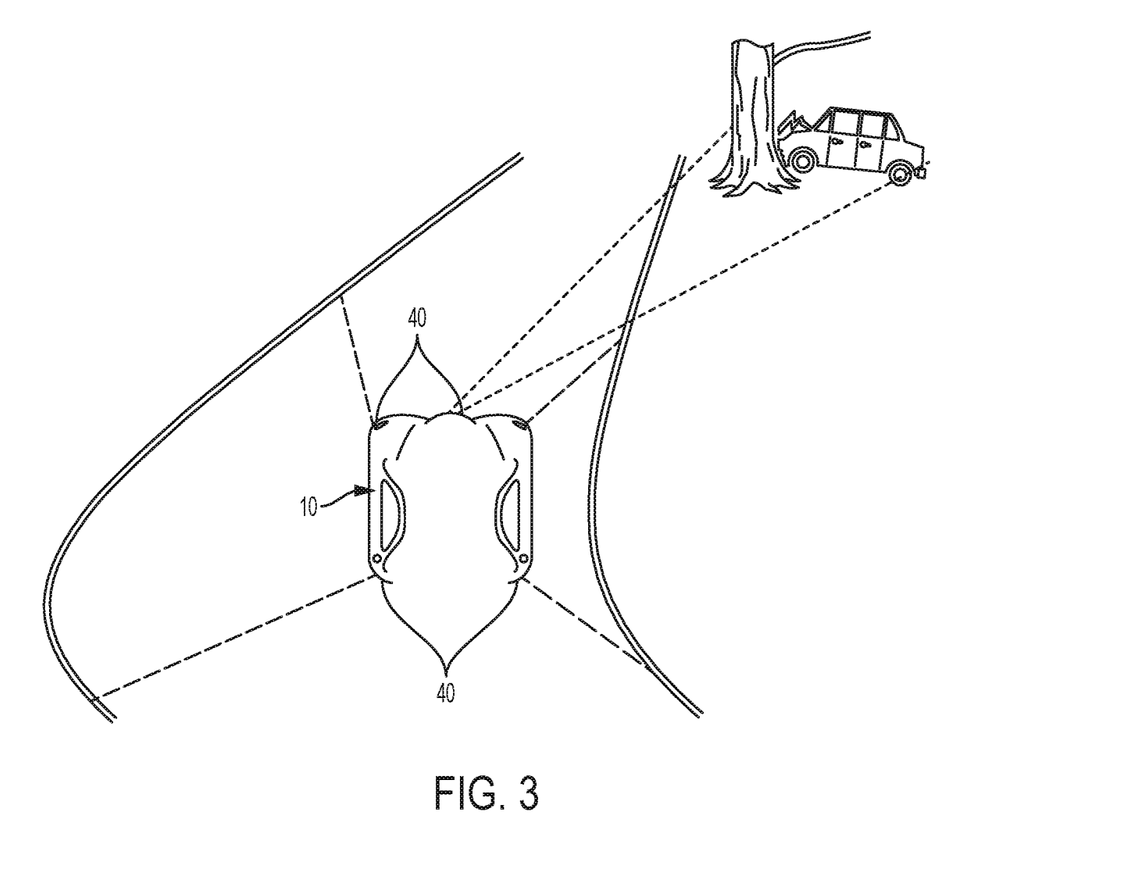
FIG. 3 is a perspective view of an autonomous vehicle arriving at an incident in accordance with embodiments of the invention.

With continued reference to FIGS. 1 and 2 and with additional reference to FIG. 3, an exemplary troublesome incident may be a car that has run into a tree on the side of a road. Here, autonomous vehicle 10 is driving along the road and is sensing conditions of the road which is directly relevant to the driving operations. The CPU 51 is receptive of information from the plurality of the sensors 40 and controls the driving operations accordingly. In addition, the plurality of the sensors 40 also sense an incident (which is, in fact, a car that has run into a tree) on the side of the road. This may be accomplished by the optical sensors 41 optically sensing the light that is reflected off of the tree and the car and generating information that is reflective thereof and by the CPU 51 recognizing, from details of that information, that the reflected light of the tree and the car is consistent with an accident. Thus, the CPU 51 interprets the portion of the received information from the plurality of the sensors 40 as being indicative of a troublesome incident (i.e., the accident). The CPU 51 further determines that the troublesome incident is associated with a need for help which could be directed toward addressing the troublesome incident. To this end, the CPU 51 may refer to historical and contextual information that is stored in the memory unit 52 or is otherwise available in an external database, such as the Cloud.

Figure 4:
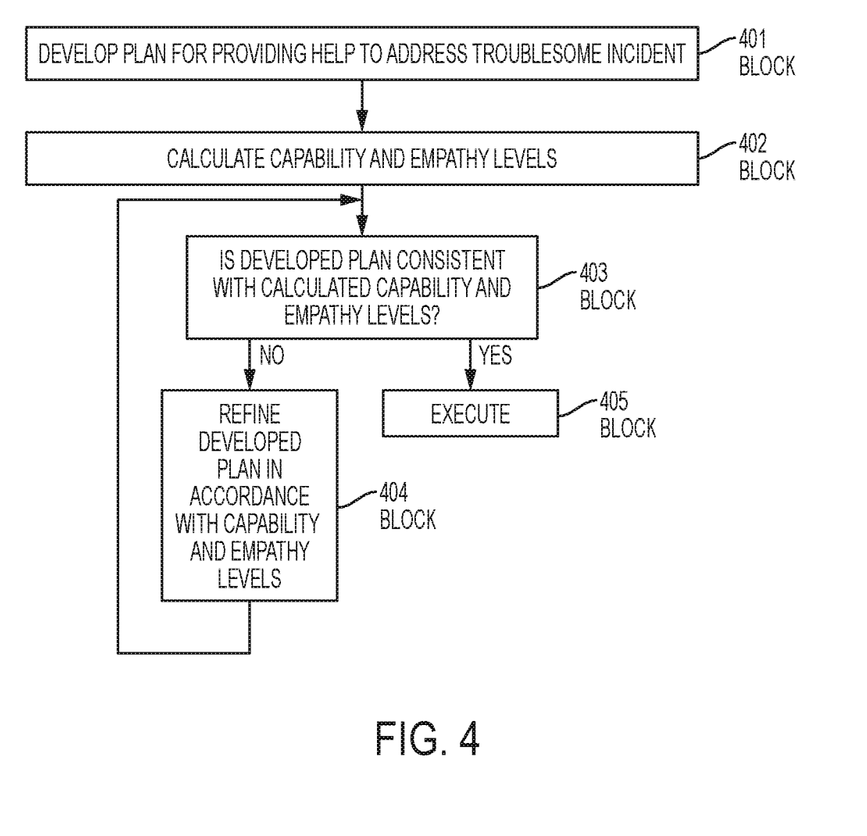
FIG. 4 is a flow diagram illustrating a method of operating the autonomous vehicle of FIG. 3.

With reference to FIG. 4, the program instructions may cause the CPU 51 to take further operational steps or actions. As shown in FIG. 4, once the CPU 51 determines that the troublesome incident has occurred and that a need for help to address the troublesome incident exists, the program instructions may cause the CPU 51 to develop a plan for providing the help to address the troublesome incident (block 401). In accordance with embodiments of the invention, the developed plan may include various duties to be undertaken by the autonomous vehicle 10 (or features thereof), such as, but not limited to stopping and investigating, notifying authorities and activating intervening and taking action to address the troublesome incident. In addition, the program instructions may cause the CPU 51 to calculate a capability level of features of the autonomous vehicle 10 and an empathy level of an owner of the autonomous vehicle 10 (block 402), to determine whether the developed plan is consistent with the capability and empathy levels (block 403) and to refine the developed plan in accordance with results of the determining (block 404). The program instructions may further cause the CPU 51 to control the features of the autonomous vehicle 10 by way of the servo control units 54 in order to execute one or more duties of the refined, developed plan (block 405).

In accordance with embodiments of the invention, the CPU 51 may calculate the capability level in accordance with autonomous vehicle information and current driving conditions. That is, if the developed plan calls for a disabled car to be towed and the autonomous vehicle information indicates that the autonomous vehicle 10 has a winch and sufficient torque to tow the disabled car to a service station, the CPU 51 will calculate that the autonomous vehicle 10 has a relatively high capability level. On the other hand, if the developed plan calls for a notification to be sent to authorities but the autonomous vehicle 10 lacks features for doing so, the CPU 51 may calculate that the autonomous vehicle 10 has a relatively low capability level. Similarly, if the developed plan calls for towing that the autonomous vehicle 10 would normally be capable of but the current driving conditions indicate that the disabled vehicle needs to be towed up a steep incline on slick roads, the CPU 51 may calculate that the autonomous vehicle 10 has a relatively low capability level.

In accordance with embodiments of the invention, the CPU 51 may calculate the empathy level in accordance with historic owner information and owner instructions. Here, if the owner of the autonomous vehicle has previously stopped and offered assistance to drivers of disabled vehicles, the CPU 51 may calculate a relatively high empathy level in general or at least where incidents that are similar to those already recorded are encountered. That is, while an owner may have been historically empathetic during daylight hours, the historical data may be weighed relatively lightly during nighttime events that are somewhat more inherently dangerous. Meanwhile, in an event the owner of the autonomous vehicle 10 inputs an instruction to be particularly empathetic or non-empathetic, such instruction may override any decision or determination made by the CPU 51.

For those cases in which the CPU 51 calculates high capability and empathy levels, the CPU 51 may determine that there is little to no need for refinement of the developed plan of block 404 and in such cases the CPU 51 may proceed with executing the control of the features of the autonomous vehicle 10 by way of the servo control units 54 in order to execute the one or more duties of the slightly refined or unrefined, developed plan as in block 405. Conversely, for those cases in which the CPU 51 calculates low capability and empathy levels, the CPU 51 may determine that there is a substantial need for refinement of the developed plan of block 404. In such cases, where the developed plan call for towing and the autonomous vehicle 10 is not only incapable of towing but also non-empathetic, the CPU 51 may replace the towing duty with a simple phone call, which does not require a stop, to local authorities to automatically notify them of an incident.

Figure 5:
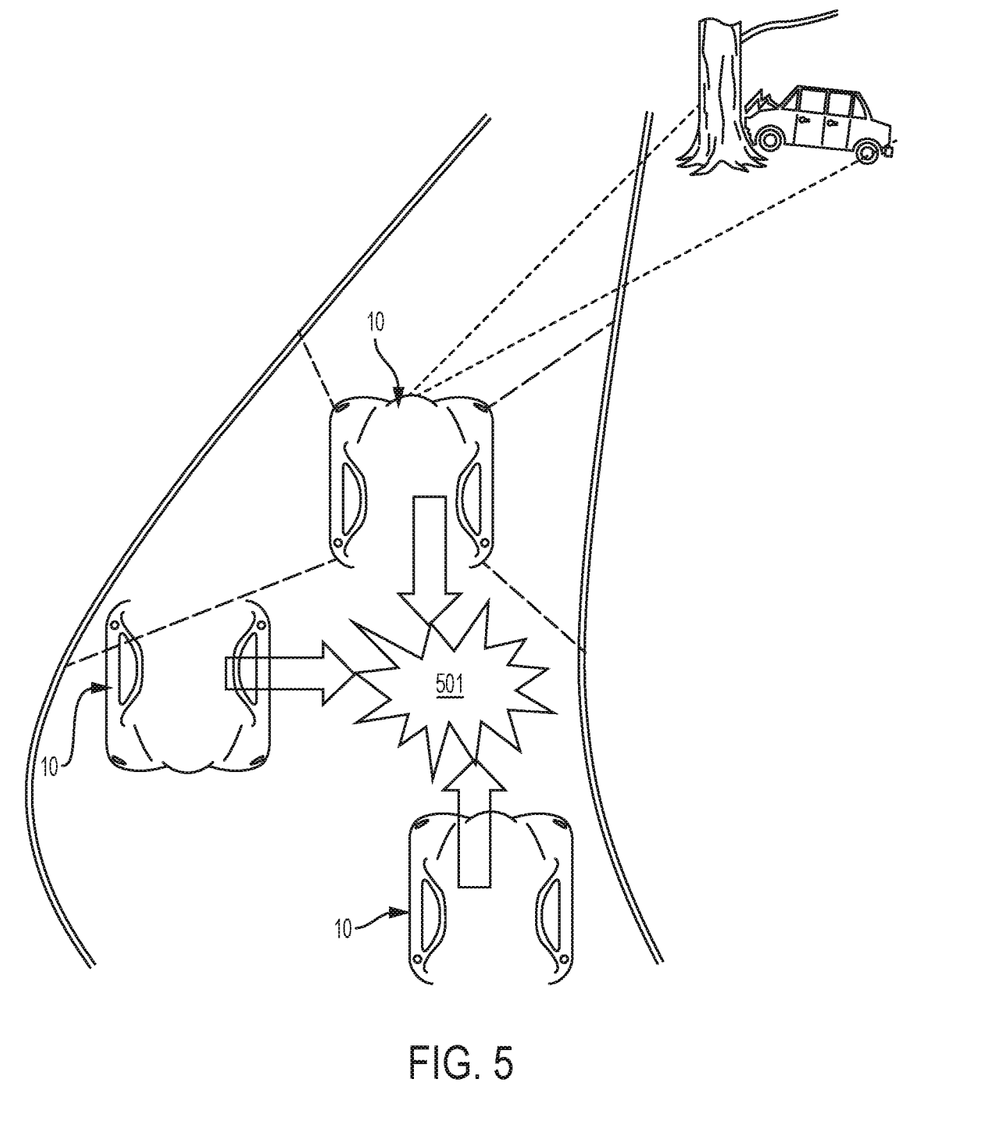
FIG. 5 is a perspective view of multiple autonomous vehicles at an incident in accordance with embodiments of the invention.

With continued reference to FIGS. 1 and 2 and with additional reference to FIG. 5, an exemplary troublesome incident may again be a car that has run into a tree on the side of a road. Here, multiple autonomous vehicles 10 are driving along the road and are each sensing conditions of the road which are directly relevant to the driving operations. The CPU 51 for each autonomous vehicle 10 is operative as described above. In addition, the program instructions may cause each of the CPUs 51 to be communicative with the other CPUs 51 to form a network 501. This network 501 would then be configured to cooperatively interpret at least a portion of the received information from the pluralities of the sensors 40 as being indicative of a troublesome incident and to cooperatively deduce that a need for help to address the troublesome incident exists.

Figure 6:
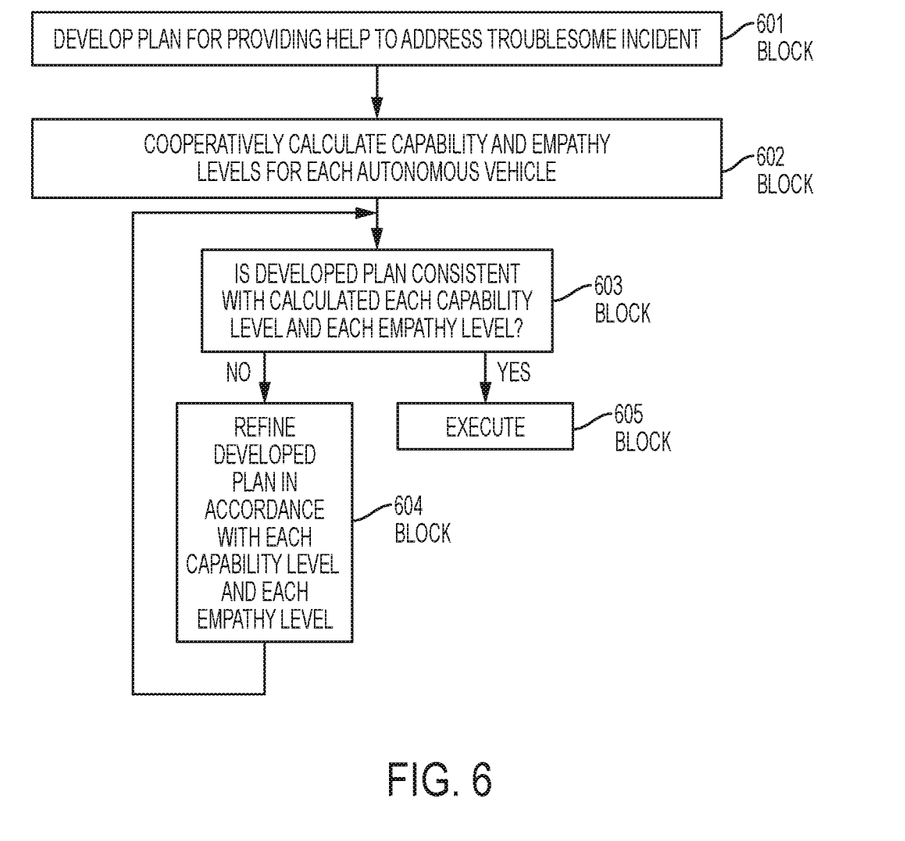
FIG. 6 is a flow diagram illustrating a method of operating the multiple autonomous vehicles of FIG. 5.

As shown in FIG. 6, once the network 501 determines that the troublesome incident has occurred and that a need for help to address the troublesome incident exists, the network 501 develops a plan for providing the help to address the troublesome incident (block 601). In accordance with embodiments of the invention, the developed plan may include various duties to be undertaken by one or more of the multiple autonomous vehicles 10 (or the respective features thereof), such as, but not limited to stopping and investigating, notifying authorities and activating intervening and taking action to address the troublesome incident. In addition, the network 501 may calculate a capability level of features of each of the multiple autonomous vehicles 10 and empathy levels of each owner of each of the multiple autonomous vehicles 10 (block 602), to determine whether the developed plan is consistent with the respective capability levels and the respective empathy levels (block 603) and to refine the developed plan in accordance with results of the determining (block 604). The program instructions may further cause the CPU 51 of each of the multiple autonomous vehicles 10 to control the features of the autonomous vehicle 10 by way of the servo control units 54 in order to execute one or more duties of the refined, developed plan which is/are assigned to that autonomous vehicle 10 (block 605).

In accordance with embodiments of the invention, the network 501 may calculate the capability level in accordance with autonomous vehicle information and current driving conditions. That is, if the developed plan calls for a disabled car to be towed and the autonomous vehicle information indicates that one of the multiple autonomous vehicles 10 is too small and underpowered for towing but another one of the multiple autonomous vehicles 10 has a winch and sufficient torque to tow the disabled car to a service station, the network 501 will calculate that the first autonomous vehicle 10 has a relatively low capability level but that the second autonomous vehicle 10 has a relatively high capability level. If the developed plan calls for a notification to be sent to authorities and the first and second autonomous vehicles 10 are capable of doing so, the network 501 may calculate that both the first and second autonomous vehicles 10 have relatively high capability levels. Similarly, if the developed plan calls for towing that the first autonomous vehicle 10 would normally be incapable of but the current driving conditions indicate that the disabled vehicle needs to be towed down a steep incline on dry, the network 501 may calculate that the first autonomous vehicle 10 has a relatively high capability level.

In accordance with embodiments of the invention, the network 501 may calculate the empathy levels in accordance with historic owner information and owner instructions. Here, if the owners of the multiple autonomous vehicles 10 have previously stopped and offered assistance to drivers of disabled vehicles, the network 501 may calculate relatively high empathy levels in general or at least where incidents that are similar to those already recorded are encountered. That is, while an owner may have been historically empathetic during daylight hours, the historical data may be weighed relatively lightly during nighttime events that are somewhat more inherently dangerous. Meanwhile, in an event the owners of the multiple autonomous vehicles 10 input instructions to be particularly empathetic or non-empathetic, such instructions may override any decision or determination made by the network 501.

For those cases in which the network 501 calculates high capability and empathy levels, the network 501 may determine that there is little to no need for refinement of the developed plan of block 604 and in such cases the network 501 may proceed with assigning the one or more duties of the slightly refined or unrefined, developed plan to the most capable and empathetic autonomous vehicles 10 and then executing the control of the features of the assigned autonomous vehicles 10 by way of the servo control units 54 in order to execute the one or more duties. Conversely, for those cases in which the network 501 calculates low capability and empathy levels, the network 501 may determine that there is a substantial need for refinement of the developed plan of block 604. In such cases, where the developed plan call for towing and the multiple autonomous vehicles 10 are capable of towing if they are working together, the network 501 may replace the towing duty with a combination towing duty to be executed by each of the autonomous vehicles 10 together.

Thus, with the above-described embodiments provided, the pluralities of the sensors 40 installed in each of the multiple autonomous vehicles 10 will be analyzing contextual surrounding information to determine if anything occurring in those surroundings is or may be looking for help. The multiple autonomous vehicles 10 may communicate with each other and with other nearby vehicles to identify which autonomous vehicle 10 or non-autonomous vehicle can offer such help. Subsequently, as each autonomous vehicle 10 or non-autonomous vehicle is assigned to execute or be responsible for a particular activity, the activities can be accomplished or reassigned as needed (i.e., according to comparative priority scores or other factors).

That is, if an autonomous vehicle 10 finds that there is an accident, the autonomous vehicle 10 will communicate the same to surrounding autonomous vehicles 10 to identify which one can offer help. Here, in an event the autonomous vehicle 10 is driving away from the accident while another is driving toward the accident, the second autonomous vehicle 10 will have a higher comparative priority score (and a lower severity score). In this case, the second autonomous vehicle 10 will offer the help.

In another case, if an autonomous vehicle 10 has identified that a person has fallen down on the roadside and there are no other people nearby to help, the autonomous vehicle 10 will communicate with nearby vehicles to find which one can offer help. Each nearby vehicle will then perform comparative priority analysis of the need of offering help with the assigned activity. Software installed in the autonomous vehicle 10 will identify which vehicle is having comparatively less propriety with respect to the assigned activity. If no such vehicle is found, the autonomous vehicle 10 may notify the owner of the autonomous vehicle 10 if the autonomous vehicle 10 can offer help. Using self-learning methods and algorithms, the autonomous vehicle 10 will learn if the owner is empathetic and how willing he is to help other people and in what scenarios he is willing to help. The autonomous vehicle 10 will thus be learning to offer a same kind of help.

Figure 7:
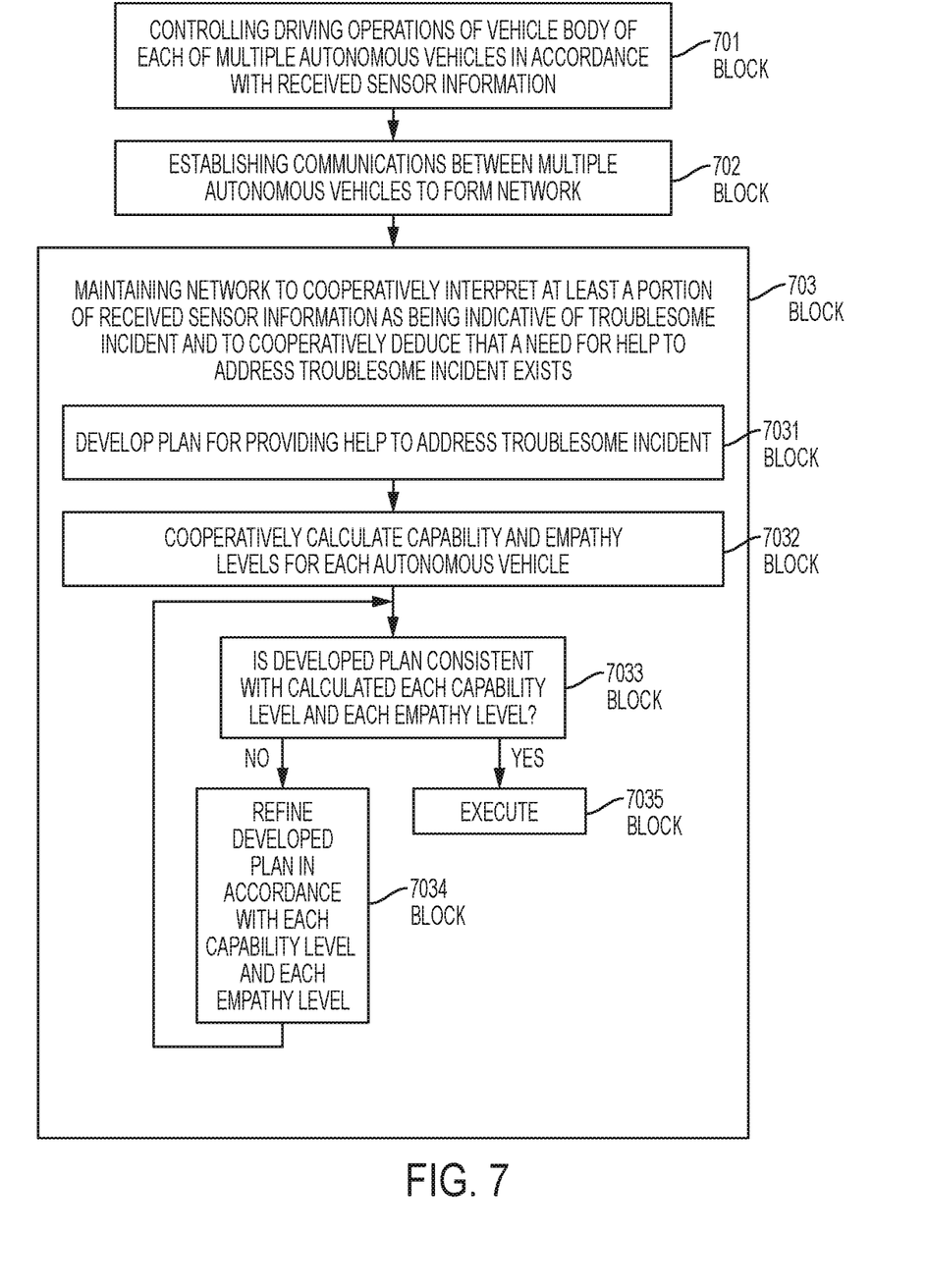
FIG. 7 is a flow diagram illustrating a method of operating multiple autonomous vehicles in accordance with embodiments of the invention.

With reference to FIG. 7, a method of operating multiple autonomous vehicles is provided. The method includes controlling driving operations of the vehicle body of each of the multiple autonomous vehicles in accordance with received sensor information (block 701), establishing communications between processing elements of the multiple autonomous vehicles to form a network (block 702) and maintaining the network to cooperatively interpret at least a portion of the received sensor information as being indicative of a troublesome incident and to cooperatively deduce that a need for help to address the troublesome incident exists (block 703).

In accordance with embodiments of the invention, the maintaining of the network of block 703 may include cooperatively developing a plan for providing the help to address the troublesome incident (block 7031), cooperatively calculating a capability level of features of each of the multiple autonomous vehicles and an empathy level of each owner of each of the multiple autonomous vehicles (block 7032), cooperatively determining whether the developed plan is consistent with the capability and empathy levels (block 7033), cooperatively refining the developed plan in accordance with results of the determining (block 7034) and executing the refined, developed plan (block 7035). The cooperatively developing of the plan may include assigning one or more of the multiple autonomous vehicles to be responsible for one or more duties of the developed plan, the cooperative calculating of the capability level of each of the multiple autonomous vehicles may be in accordance with autonomous vehicle information and current driving conditions and the cooperative calculating of the empathy level of each owner of each of the multiple autonomous vehicles is may be in accordance with historic owner information and owner instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An autonomous vehicle, comprising:
a vehicle body;
sensors deployed on the vehicle body to sense surroundings of the vehicle body; and
a processing element coupled to the vehicle body and the sensors,
the processing element being configured to receive information from the sensors, to control driving operations of the vehicle body in accordance with the received information, to interpret at least a portion of the received information as being indicative of an incident and to determine that towing or vehicle maintenance is needed to address the incident,
the processing element being further configured to:
develop a plan for addressing the incident,
calculate a capability level of features of the autonomous vehicle in accordance with autonomous vehicle information that defines a tow capability level for accomplishing the towing and a supply of assistance tools for accomplishing the vehicle maintenance and in accordance with current driving conditions, calculate an empathy level of an owner of the autonomous vehicle in accordance with historic owner information that defines a willingness of the owner to stop and offer the towing or the vehicle maintenance and in accordance with owner instructions, determine whether the developed plan is consistent with the capability and empathy levels, and refine the developed plan in accordance with a determination of whether the developed plan is consistent with the capability and empathy levels to generate a refined developed plan.

2. The autonomous vehicle according to claim 1, wherein the sensors comprise at least one of optical and audio sensors.

3. The autonomous vehicle according to claim 1, wherein the developed plan comprises at least one of stopping and investigating, notifying authorities and actively taking action to address the incident.

4. The autonomous vehicle according to claim 1, wherein the processing element is further configured to control the features of the autonomous vehicle to execute one or more duties of the refined developed plan.

5. The autonomous vehicle according to claim 1, wherein the developed plan comprises stopping and investigating, notifying authorities and actively taking action to address the incident.

6. An autonomous vehicle, comprising:

sensors deployed to sense surroundings of a vehicle body; and a processing element coupled to the sensors, the processing element being configured to receive information from the sensors, to control driving operations of the vehicle body in accordance with the received information, to interpret at least a portion of the received information as being indicative of an incident and to determine that towing or vehicle maintenance is needed to address the incident, the processing element being further configured to:

develop a plan for addressing the incident, calculate a capability level of features of the autonomous vehicle in accordance with autonomous vehicle information that defines a tow capability level for accomplishing the towing and a supply of assistance tools for accomplishing the vehicle maintenance and in accordance with current driving conditions, calculate an empathy level of an owner of the autonomous vehicle in accordance with historic owner information that defines a willingness of the owner to stop and offer the towing or the vehicle maintenance and in accordance with owner instructions, determine whether the developed plan is consistent with the capability and empathy levels, and refine the developed plan in accordance with a determination of whether the developed plan is consistent with the capability and empathy levels to generate a refined developed plan.

7. The autonomous vehicle according to claim 6, wherein the sensors comprise at least one of optical and audio sensors.

8. The autonomous vehicle according to claim 6, wherein the developed plan comprises at least one of stopping and investigating, notifying authorities and actively taking action to address the incident.

9. The autonomous vehicle according to claim 6, wherein the developed plan comprises stopping and investigating, notifying authorities and actively taking action to address the incident.

10. The autonomous vehicle according to claim 6, wherein the processing element is further configured to control the features of the autonomous vehicle to execute one or more duties of the refined developed plan.

* * * * *